United States Patent [19]

Ross et al.

[11] Patent Number: 4,600,218

[45] Date of Patent: Jul. 15, 1986

[54] SEPARABLE HIGH PRESSURE GAS LINE ISOLATOR

[75] Inventors: Oakley G. Ross, Paso Robles; Mark L. Kline, Fullerton; Larry D. Wedertz, Mira Loma, all of Calif.

[73] Assignee: General Dynamics, Pomona Division, Pomona, Calif.

[21] Appl. No.: 673,697

[22] Filed: Nov. 21, 1984

[51] Int. Cl.⁴ .................................................. F16L 59/02
[52] U.S. Cl. ...................................... 285/50; 285/52; 285/54; 285/353; 285/904; 285/918
[58] Field of Search ............... 285/50, 52, 54, DIG. 5, 285/108, 109, 113, 386, 389, 384, 385, DIG. 19, 353

[56] References Cited

U.S. PATENT DOCUMENTS

| | | | |
|---|---|---|---|
| 371,598 | 10/1887 | Landis | 285/328 |
| 506,034 | 10/1893 | Burtchaell | 285/52 |
| 553,844 | 2/1896 | Duntley | 285/52 |
| 554,332 | 2/1896 | Carson | 285/52 |
| 604,159 | 5/1898 | Phelps, Jr. | 285/328 |
| 755,442 | 3/1904 | Brickell | 285/DIG. 19 |
| 1,248,275 | 11/1917 | Crowe | 285/DIG. 19 |
| 1,595,310 | 8/1926 | Mueller et al. | 285/328 |
| 1,834,581 | 12/1931 | Ferrell et al. | 285/328 |
| 2,407,076 | 9/1945 | Harkness | 285/DIG. 19 |
| 2,507,261 | 5/1946 | Mercier | 285/DIG. 19 |
| 2,535,694 | 7/1946 | Payne | 285/DIG. 19 |
| 2,570,224 | 1/1949 | Fason | 285/DIG. 19 |
| 2,627,580 | 2/1953 | Picard | 285/DIG. 19 |
| 2,669,465 | 2/1954 | Newell | 285/52 |
| 2,703,719 | 3/1955 | Crothers | 285/DIG. 19 |
| 2,752,579 | 6/1956 | Caldwell et al. | 285/52 |
| 2,837,351 | 6/1958 | Bailey | 285/328 |
| 2,900,199 | 8/1959 | Logan | 285/DIG. 19 |
| 2,918,312 | 12/1959 | Filstrup | 285/50 |
| 2,950,928 | 8/1960 | Bowan | 285/DIG. 20 |
| 3,091,483 | 5/1963 | Hruby, Jr. | 285/DIG. 19 |
| 3,284,112 | 11/1966 | Martin | 285/328 |
| 3,328,053 | 6/1967 | Mattimore et al. | 285/50 |
| 3,482,860 | 12/1969 | Dawbarn et al. | 285/386 |
| 3,503,633 | 3/1970 | Braun et al. | 285/54 |
| 3,712,055 | 1/1973 | McCabe | 285/DIG. 19 |
| 4,254,973 | 3/1981 | Benjamin | 285/328 |

FOREIGN PATENT DOCUMENTS

| | | | |
|---|---|---|---|
| 103968 | 5/1937 | Australia | 285/52 |
| 199957 | 10/1958 | Austria | 285/DIG. 9 |
| 105304 | 10/1959 | Denmark . | |
| 1330464 | 10/1963 | France | 285/DIG. 19 |
| 588781 | 6/1947 | United Kingdom | 285/328 |
| 842233 | 7/1958 | United Kingdom . | |
| 1219653 | 1/1971 | United Kingdom | 285/54 |
| 1303240 | 1/1973 | United Kingdom | 285/50 |
| 1437587 | 5/1976 | United Kingdom | 285/54 |

Primary Examiner—Cornelius J. Husar
Assistant Examiner—Eric K. Nicholson
Attorney, Agent, or Firm—Neil F. Martin; Loyal M. Hanson; Edward B. Johnson

[57] ABSTRACT

A separable electrical isolator for coupling two pieces of conductive tubing carrying high pressure cryogenic gas includes a gas-impervious dielectric spacer with a pair of opposing surfaces and a bore extending therebetween in which the pieces of tubing are sealed axially-aligned in fluid communication with an electrically-nonconductive gap between them. A pair of complementary coupling members are rigidly attached to the pieces of tubing to define outwardly-extending annular surfaces that are each sealed about the periphery of a corresponding piece in a position slightly set back from and facing an end of the piece. The coupling members are separably and nonconductively interconnected with the annular surfaces facing the spacer surfaces and O-ring seals in between to apply compressive force to the spacer and seals and thereby effect the seal.

8 Claims, 3 Drawing Figures

SEPARABLE HIGH PRESSURE GAS LINE ISOLATOR

BACKGROUND OF THE INVENTION

This invention relates in general to electrical insulators, and pertains particularly to an isolator for electrically isolating two conductive sections of tubing.

Isolators for coupling two conductive sections of tubing with an electrically-nonconductive joint exist in the prior art. However, present day technology requirements place severe design constraints on such isolators that were not present or provided for in the past.

For example, an infrared detector, such as may be used as part of an infrared seeker or scanner in helicopters or air-to-ground missiles, must be cool in order to develop maximum sensitivity. Metal tubing is often used to deliver a cooling gas to the detector, and since the tubing may couple stray electrical signals to the detector and cause it to malfunction, an isolator is desired. Inserting an insolator in the metal tubing line decreases coupling of stray signals and the probability of detector malfunctioning.

The high pressure of up to 7,000 pounds-per-square inch and more, along with the temperatures in the range of −423 degrees Fahrenheit that characterize the cooling gas employed, make existing isolators inadequate for this purpose.

Therefore, it is desirable to have an isolator for electrically isolating two conductive sections of line that can withstand high pressure cryogenic gas. And, it is desirable that the coupler be separable, relatively small and lightweight, and insertable in an existing line.

SUMMARY OF THE INVENTION

This invention provides a new and improved separable isolator for coupling two pieces of conductive tubing with an electrically-isolating joint that can withstand high pressure cryogenic gas.

An exemplary embodiment of the isolator includes a pair of complementary coupling members attached to the pieces of tubing, each coupling member being rigidly attached to a corresponding one of the pieces to define an outwardly-extending annular surface that is sealed about the periphery of the corresponding piece. Each annular surface is in a position facing and slightly set back from an end of the corresponding piece.

A gas-impervious dielectric spacer is provided between the annular surfaces. The spacer has two opposing surfaces, each of which faces a separate one of the annular surfaces, and a bore extending therebetween into which the tubing ends extend. The spacer has a width between the two opposing surfaces sufficient to prevent contact between the tubing ends.

The isolator includes a pair of O-ring seals. Each seal is in a position about a separate one of the pieces of tubing between one of the annular surfaces and the facing spacer surface. The coupling members are nonconductively interconnected to compress the seals and thereby seal the tubing ends in fluid communication while at the same time maintaining them electrically isolated.

Other features and many attendant advantages of the invention will become more apparent upon a reading of the detailed description together with the drawings, wherein like reference numerals refer to like parts throughout.

DETAILED DESCRIPTION

Figure 1:
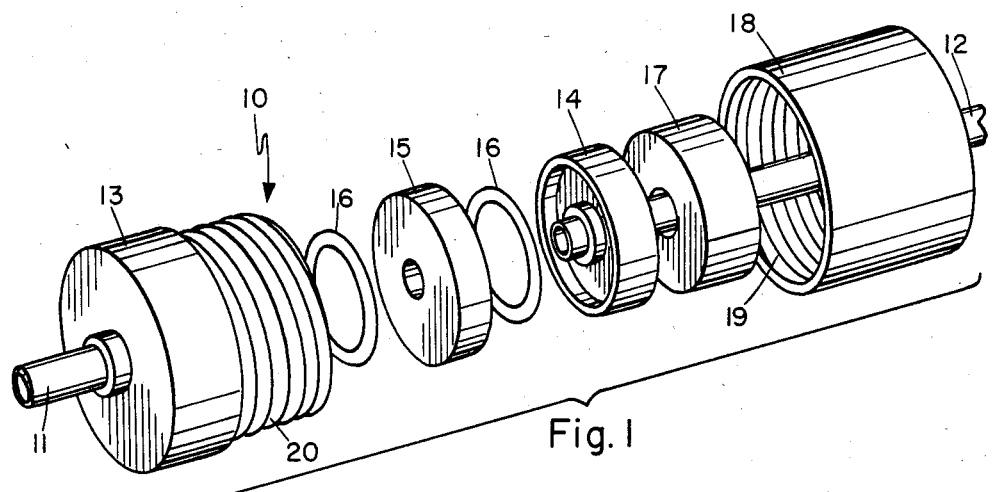
FIG. 1 is an exploded perspective view of an exemplary embodiment of a separable isolator constructed in accordance with the invention.
Figure 2:
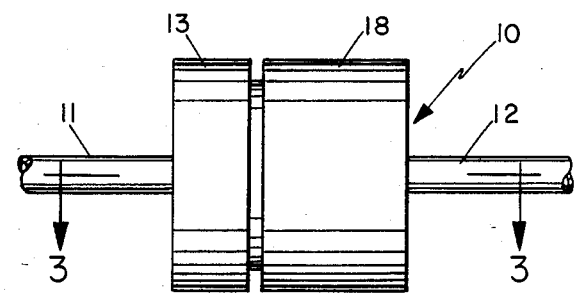
FIG. 2 is a side elevation view of the assembled isolator.
Figure 3:
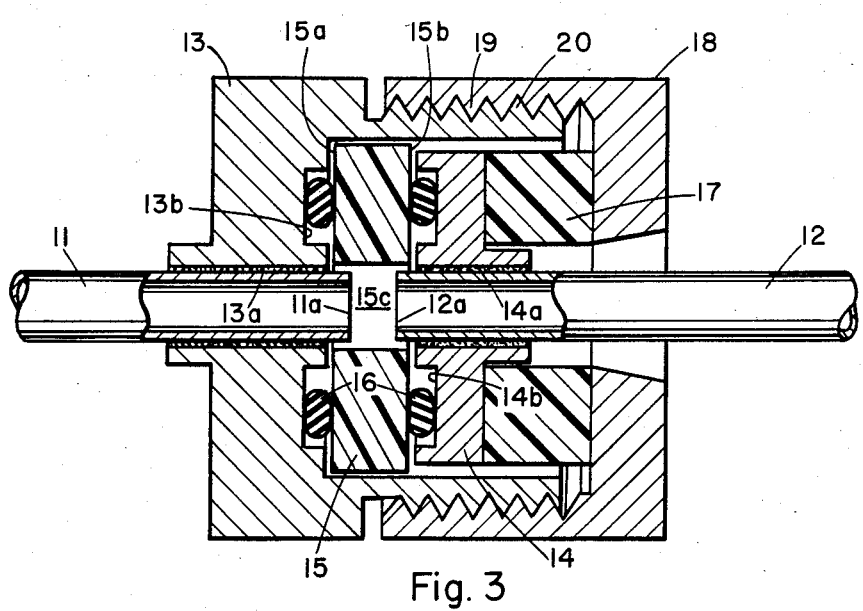
FIG. 3 is an enlarged sectional view taken on line 3—3 of FIG. 2.

An exemplary embodiment of a separable electrical isolator constructed in accordance with the invention is shown in FIGS. 1-3. It is referred to generally by reference numeral 10 in FIG. 1 where it is shown in place on two pieces of tubing, tubing 11 and tubing 12.

A first coupling member, socket 13, is attached to tubing 11, and a second coupling member, plug 14, is attached to tubing 12. Dielectric spacer 15 is included and assembled, with O-rings 16, between the socket and plug as illustrated.

Dielectric washer 17 and a cap 18 are utilized to nonconductively interconnect the socket and plug with the dielectric spacer and O-ring seals compressed in between. Interior threads 19 on cap 18 mate with exterior threads 20 on socket 13 to separably engage the socket with the cap for this purpose. By screwing the cap onto the socket with the components assembled as illustrated, the tubing ends are sealed within the dielectric spacer with a nonconductive gap between them.

The assembled isolator is shown in FIG. 2, and further details are shown in the enlarged sectional view of FIG. 3.

Tubing 11 and tubing 12 represent stainless steel tubing having an inside diameter of approximately 0.04 inch, such as may typically be used to carry high pressure cryogenic gas to an infrared detector. Socket 13 is also composed of stainless steel material. It is rigidly attached to tubing 11 by suitable means such as brazing, brazing 13a illustrating this aspect of the invention in FIG. 3. Socket 13 defines a first annular surface 13b. This annular surface is sealed about the periphery of tubing 11 by virtue of brazing 13a. It extends radially-outward with respect to the periphery of tubing 11 in a position facing an end of tubing 11, tubing end 11a. First annular surface 13b is slightly set back from tubing end 11a and it serves as a surface against which one of the O-rings is compressed.

Plug 14 is rigidly attached to the other piece of tubing, tubing 12, by suitable means such as brazing, of which brazing 14a is illustrative in FIG. 3. Plug 14 is composed of stainles steel, also. It defines second annular surface 14b. Second 14b is sealed about the periphery of tubing 12 by virtue of brazing 14a, and it extends radially-outward with respect to the periphery of tubing 12 in a position facing and slightly set back from an end of tubing 12, tubing end 12a. Second annular surface 14b serves a surface against which the other one of the O-rings is compressed.

Socket 13 and plug 14 constitute complemetary coupling members which mate with one another to compress a dielectric spacer and O-ring seals in between to form a sealed isolator.

Dielectric spacer 15 is employed (FIG. 3). It is located between the two annular surfaces of socket 13 and plug 14. Spacer 15 is composed of a gas-impervious dielectric material, such as manufactured by DuPont under the tradename DELRIN, that can with stand high pressure cryogenic gas while maintaining the tubing ends sealed within by means by compressive force applied by the two annular surfaces.

The dielectric spacer has two opposing surfaces, spacer surface 15a and spacer surface 15b, together with a bore extending therebetween, bore 15c. The bore has a cross section large enough so that the tubing ends extend into it. The tubing ends are axially-aligned in an approximate sense, and the spacer has a thickness betwee the two oppsing spacer surfaces sufficient to prevent the tubing ends from contacting each other.

The O-rings cooperate with the spacer to effect a seal, and they are also composed of a gas-impervious material such as DERLIN. Each O-ring is compressed between a corresponding one of the annular surfaces and the facing spacer surface (FIG. 3). The dielectric spacer is thereby sealed between the two annular surfaces with the tubing ends sealed in fluid communication within the spacer.

The invention includes means for separably and nonconductively connecting the coupling members together to compress the O-rings and dielectric spacer. In the illustrated embodiment the two annular surfaces are compressed against the O-rings by means of the structure interconnecting socket 13 and plug 14. As shown in FIG. 3, dielectric washer 17 and cap 18 cooperate to nonconductively secure the plug member within the socket member with the dielectric spacer and O-rings compressed in between. Dielectric washer 17 serves to nonconductively transmit copmpressive forces from cap 18 to the plug 14.

Cap 18 is provided with interior threads 19 which mate with exterior threads 20 on socket 13. Cap 18 can thereby be screwed onto socket 13 to separably interconnect the socket and plug and retain the plug within the socket with the tubing ends sealed within the dielectric spacer.

Thus, this invention uses compressive force to separably seal the tubing ends within the spacer, the bore of the spacer serving to channel fluid between the tubin ends and thereby maintain them in fluid communication. A potential leakage path exists along the bore, however, between the spacer and the tubing, as depicted in FIG. 3 by the space along the bore between the spacer and the tubing. This longitudinally-extending leakage path is difficult to seal by compressing the spacer against the tubing. To compress the spacer against the tubing would require the application of forces perpendicular to the longitudinally-extending leakage path. Such forces would be radially-directed with respect to the tubing and relatively difficult to apply as they may crush or otherwise damage the tubing.

With the isolator of this invention, the longitudinally-extending leakage path along the bore is redirected to the radially-extending leakage paths between the annular surfaces and facing spacer surfaces. The radially-extending leakage paths are more easily sealed by compression. They may be sealed by the application of opposing forces directed generally parallel to the longitudinal axis of the tubing. Such lonitudinally-directed forces may be increased in magnitude sufficiently to compress and seal the leakage paths with relative ease and without damaging the tubing.

Accordingly, the pair of coupling members of this invention combine with the gas-impervious dielectric spacer and O-ring seals to achieve a separable electrical isolator suitable for high pressure cryogenic gas.

As various changes may be made in the form, construction, and arrangement of the parts herein, without departing from the spirit and scope of the invention and without sacrificing any of its advantages, it is to be understood that all matter herein is to be interpreted as illustrative and not in any limiting sense.

What is claimed is:

1. A separable isolator suitable for coupling two pieces of conductive tubing carrying high pressure cryogenic gas, which comprises:

two pieces of tubing;

a pair of complementary coupling members, each coupling member being rigidly attached to a corresponding one of the pieces of tubing to define an outwardly-extending annular flange sealed about the periphery of the corresponding piece of tubing in a position facing and slightly set back from an end of the piece, one of the coupling members comprising a hollow socket member and the other coupling member comprising a plug member that fits within the socket member;

a gas-impervious dielectric spacer between the coupling members, the spacer having pair of opposing surfaces facing the annular flanges and a bore extending therebetween into which the tubing ends extend axially-aligned without contacting each other;

a pair of O-ring seals, each seal in a position about a separate one of the pieces of tubing between one of the annular flanges and the facing spacer surface; and means for releasably and nonconductively connecting the coupling members together to compress the seals between the annular surfaces and spacer surfaces and seal the tubing ends in fluid communication with an electrically-nonconductive gap between them.

2. The device recited in claim 1 wherein the connecting means includes a threaded cap for threaded engagement of the socket member.

3. The device recited in claim 2 which includes a dielectric washer between the cap and the plug member to nonconductively transmit compressive forces from the cap to the plug member.

4. The device recited in claim 1 wherein the space is a disc-shaped member of nylon composition.

5. The device recited in claim 1 wherein the O-ring seals are of a nylon composition.

6. The device recited in claim 1 wherein the coupling members are each composed of a stainless steel alloy.

7. The device recited in claim 1 wherein the coupling members are rigidly attached to the pieces of tubing by brazing.

8. A separable electrical isolator for coupling the ends of two lengths of conductive tubing carrying high pressure cryogenic gas; comprising:

two pieces of tubing;

a pair of complementary coupling members secured to the respective ends of the two pieces of tubing and releasably connected together; one of the coupling members comprising a hollow sleeve-like member having an open end projecting forwardly of the respective end of one tubing piece and a closed inner end defining an annular flange, the other coupling member comprising a plug member for fitting within the socket member and having an outer face defining an annular flange facing the inner end of the socket member, the outer dimensions of the plug member being less than the inner dimensions of the socket member;

a gas-impervious dielectric spacer located between the inner end of the socket member and the opposing face of the plug member, the spacer having a through bore into which the tubing ends extend in axial alignment without contacting each other;

a pair of O-ring seals, each seal located between a respective one of the annular flanges and the facing spacer surface;

means for releasably connecting the coupling members together, comprising a cap-shaped member located inwardly of the plug member on the piece of tubing to which the plug member is attached, the cap member comprising a flat end having a central opening through which the piece of tubing projects, the opening being larger than the outer dimensions of the tubing, and a cylindrical skirt projecting from the flat end, the skirt and forward end of the socket member having complementary coupling means for releasably securing the cap and socket member together; and a dielectric washer located between the plug member and the cap member for nonconductively transmitting compressive forces from the cap to the plug member.

* * * * *